Oct. 21, 1947.  W. D. W. RICHMAN  2,429,296
ROTARY CONVEYOR WITH RADIALLY MOVABLE EJECTORS
FOR FEEDING POWDERY MATERIALS
Filed Feb. 21, 1945  2 Sheets-Sheet 2
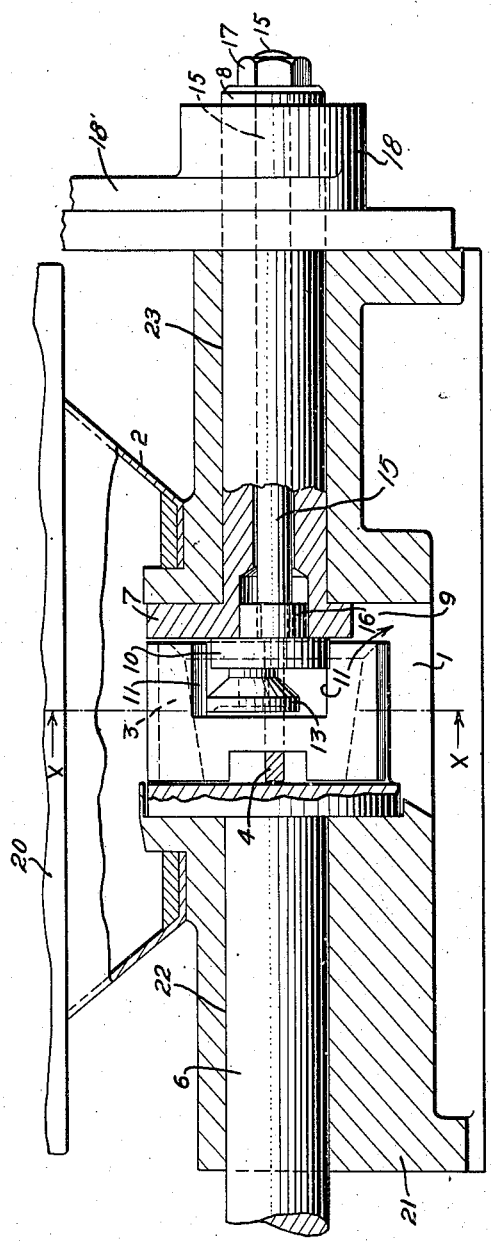
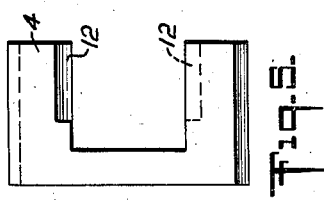
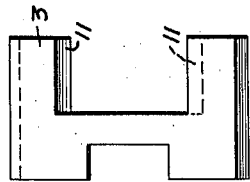
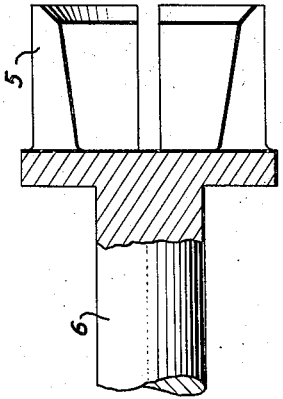
INVENTOR
WILLIAM D. W. RICHMAN
BY
Cushman, Darby & Cushman
ATTORNEYS Patented Oct. 21, 1947

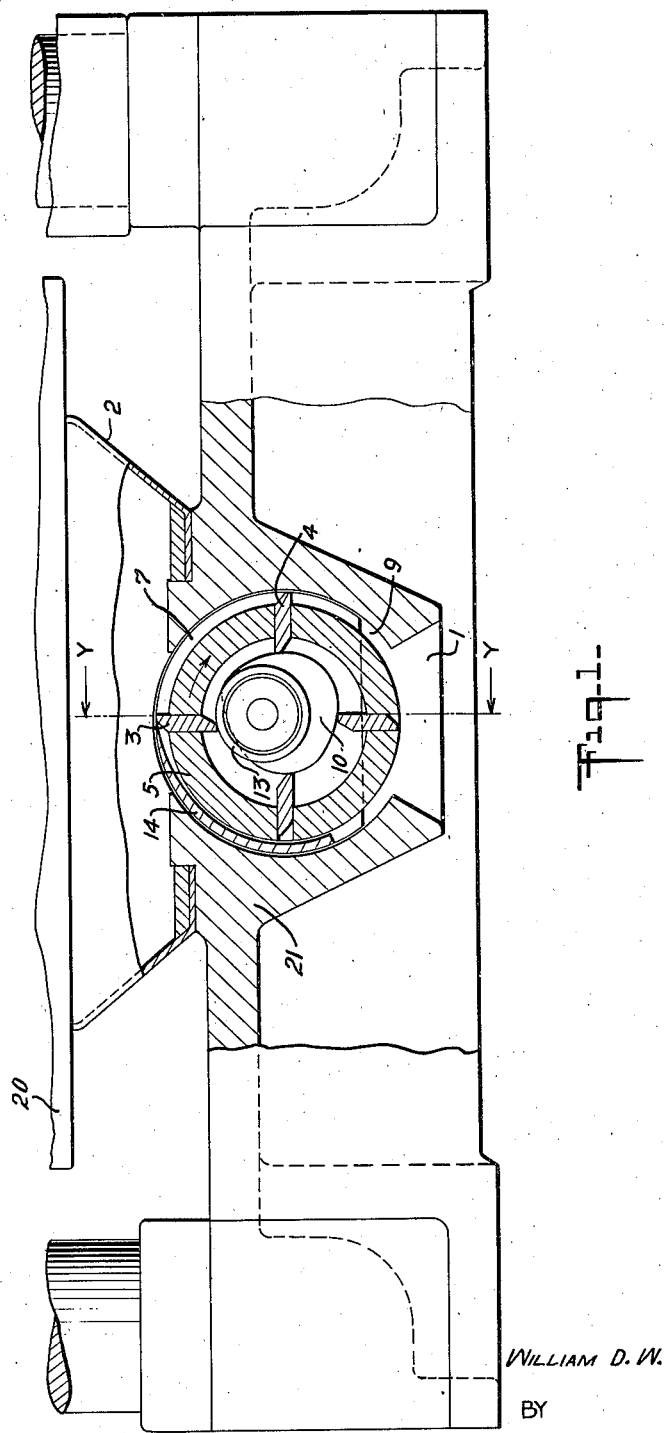

2,429,296

UNITED STATES PATENT OFFICE 2,429,296

ROTARY CONVEYOR WITH RADIALLY MOVABLE EJECTORS FOR FEEDING POWDERY MATERIALS

William D. W. Richman, Trowbridge, England

Application February 21, 1945, Serial No. 579,078
In Great Britain February 21, 1944

5 Claims. (Cl. 222—218)

This invention is an improvement in or modification of the invention described and claimed in the specification of my prior application No. 471,913 which has matured into Patent No. 2,414,273, dated January 14, 1947, and has for its object to provide simple and efficient means for obviating any difficulties or defects that may arise should powder pass along the blades in the slots in the rotor.

In accordance with my present invention, the part of the slotted carrier or rotor through which the blades slide as they are projected and retracted is hollowed out to provide a space into which any powder moving into the rotor along the blades through the blade slots can pass, and from which it can discharge through a cut-away portion of the member to which the cam actuating the blades is secured.

The invention also comprises the provision of a roller within the rotor secured to the side face of the cam actuating the blades, the said roller supporting the blades at about the mid-point of their axial width when they are projecting from the rotor into the container for the purpose of extracting material from the latter, so that any tendency of the blades to tilt due to the action of their operating cam at one end of the blades is minimised or obviated.

Referring to the accompanying explanatory drawings:

Figure 1 is a sectional elevation on the line X—X of Figure 2 and Figure 2 a sectional elevation on the line Y—Y of Figure 1 showing a powder or like feeding device constructed in one convenient form in accordance with this invention.

Figure 3 is a detail view of the blade holder shown in Figures 1 and 2 and Figures 4 and 5 detail views of the blades held in the holder.

The material to be fed to the outlet 1 by the blade arrangement illustrated is contained in a suitable receptacle or container. The receptacle 20 is provided with an incline bottom 2 to which is suitably connected a base member 21 having the vertical centrally disposed delivery outlet 1 which communicates with the bottom 2. Extending transversely from opposite sides of the outlet opening 1 are aligned openings 22 and 23 (Figure 2). The wall of the opening 22 constitutes a bearing for the rotatable shaft 6, while the wall of the opening 23 provides a bearing for the hollow spindle 8. The blades 3 and 4 which are shown in detail in Figures 4 and 5 are nested together, are mounted in the opening 1 and are carried in the slotted carrier 5 (see Figure 3) which is revolved by the shaft 6. The interior of the carrier 5 is hollowed out as shown. The end face of the carrier comes adjacent to a disc 7 upon the hollow spindle 8, the disc being cut away at 9 to allow any material from the container bottom 2 which may pass into the interior of the carrier 5 through the blade slots therein to pass out by gravity, through the gap in the disc 7, as indicated by the arrow in Figure 2. Adjacent the disc 7 is a cam 10 which engages the inner edges 11 and 12 of the blades 3 and 4 respectively as the blades are revolved with the carrier 5 and so cause the blades to have a radial or an in-and-out movement relatively to the carrier periphery. The cam 10 is carried by a spindle or shaft 15 which extends longitudinally or axially through the hollow spindle or tubular member 8.

Carried by the side face of the cam 10 is a roller 13 which can turn freely upon the pin by which it is secured to the cam. Such roller engages or is engaged by each blade as it comes beneath the bottom 2 so that the blade projects into the container to extract material therefrom, the roller supporting the blade at a substantially midposition and keeping the blade from tilting due to the action of the cam 10 which operates on the end only of the blade. It will be seen that the blades project from the periphery of the carrier when they come beneath the container in order that they may extract material from the latter and that the blades are withdrawn into the carrier when delivery is to take place into the delivery outlet 1. A guard ring 14 projecting from the face of the disc 7 limits the area within the container 2 into which the blades project for the purpose of extracting material from the container as will be readily understood. The angular adjustment of the disc 7 is effected by turning the tubular member 8 which is keyed or otherwise secured to a quadrant or sleeve 18 having an operating handle 18' positioned adjacent one end of the feed device. This adjustment also controls the position of the guide ring 14. The cam 10 and the roller 13 are adjusted angularly by turning of the spindle 15, which is supported adjacent one end in the boss 16. A nut 17 is threaded to the outer end of the spindle 15 for maintaining the latter in its locked position.

I claim:

1. A feed device of the class described having in combination, a base, a hopper mounted on the base, said base having a vertical feed passage communicating with the hopper and transversely disposed openings communicating with the feed passage on opposite sides thereof, a rotatable shaft extending into one of said openings and having a carrier positioned in said passage, spaced movable blades mounted in said carrier, a tubular member mounted in the other of said openings and having a disc positioned in the feed passage, a spindle extending longitudinally through said tubular member and having a cam positioned within the carrier for engaging one end of the blades to impart radial movement to the latter when the carrier is rotated, and means mounted in the carrier and engaging intermediate portions of the blades to prevent tilting of the latter when the carrier is rotated.

2. A feed device of the class described having in combination, a base, a hopper mounted on the base, said base having a vertical feed passage communicating with the hopper and transversely disposed openings communicating with the feed passage on opposite sides thereof, a rotatable shaft extending into one of said openings and having a slotted carrier positioned in said passage, spaced movable blades mounted in said carrier, a tubular member mounted in the other of said openings and having a disc positioned in the feed passage, a spindle extending longitudinally through said tubular member and having a cam positioned within the carrier for engaging one end of the blades to impart radial movement to the latter when the carrier is rotated, a roller mounted in the carrier and engaging intermediate portions of the blades to prevent tilting of the latter when the carrier is rotated, a guide ring extending from the disc for controlling the area of the feed passage, and means for angularly adjusting said disc.

3. A feed device of the class described having in combination, a base, a hopper mounted on the base, said base having a vertical feed passage communicating with the hopper and transversely disposed openings communicating with the feed passage on opposite sides thereof, a rotatable shaft extending into one of said openings and having a slotted carrier positioned in said passage, spaced movable blades mounted in said carrier, a tubular member mounted in the other of said openings and having a disc positioned in the feed passage, a spindle extending longitudinally through said tubular member and having a cam positioned within the carrier for engaging one end of the blades to impart radial movement to the latter when the carrier is rotated, a roller mounted in the carrier and engaging intermediate portions of the blades to prevent tilting of the latter when the carrier is rotated, a guide ring extending from the disc for controlling the area of the feed passage, and means for angularly adjusting the cam and roller.

4. A feed device of the class described having in combination, a base, a hopper mounted on the base, said base having a vertical feed passage communicating with the hopper and transversely disposed openings communicating with the feed passage on opposite sides thereof, a rotatable shaft extending into one of said openings and having a slotted carrier positioned in said passage, spaced movable blades mounted in said carrier, a tubular member mounted in the other of said openings and having a disc positioned in the feed passage, a spindle extending longitudinally through said tubular member and having a cam positioned within the carrier for engaging one end of the blades to impart radial movement to the latter when the carrier is rotated, a roller mounted in the carrier and engaging intermediate portions of the blades to prevent tilting of the latter when the carrier is rotated, a guide ring extending from the disc for controlling the area of the feed passage, means for angularly adjusting said disc, and means for angularly adjusting the cam and roller.

5. A feed device of the class described having in combination, a base, a hopper mounted on the base, said base having a vertical feed passage communicating with the hopper and transversely disposed openings communicating with the feed passage on opposite sides thereof, a rotatable shaft extending into one of said openings and having a slotted carrier positioned in said passage, spaced movable blades mounted in said carrier, a tubular member mounted in the other of said openings and having a disc positioned in the feed passage adjacent the carrier, a spindle extending longitudinally through said tubular member and having a cam positioned within the carrier for engaging one end of the blades to impart radial movement to the latter when the carrier is rotated, a roller extending laterally from said cam into the carrier and engaging intermediate portions of the blades to prevent tilting of the latter when the carrier is rotated, a guide ring extending from the disc for controlling the area of the feed passage, means for angularly adjusting said disc, and means for angularly adjusting the cam and roller.

WILLIAM D. W. RICHMAN.

REFERENCES CITED

The following references are of record in the file of this patent:

UNITED STATES PATENTS

| Number | Name | Date |
| --- | --- | --- |
| 451,761 | Howland | May 5, 1891 |
| 709,793 | McGinnity | Sept. 23, 1902 |
| 905,395 | West | Dec. 1, 1908 |
| 1,069,083 | Gibson | July 29, 1913 |
| 2,374,132 | Raddle et al. | Apr. 17, 1945 |